VARISTOR ELEMENT HEAT-TREATED ION RADICAL SALTS

Filed Feb. 14, 1961

INVENTOR.
CHARLES FREDERICK WAHLIG,
BY Howard J. Rudge
AGENT

United States Patent Office 3,255,392

Patented June 7, 1966

3,255,392
VARISTOR ELEMENT HEAT-TREATED ION RADICAL SALTS

Charles Frederick Wahlig, Wilmington, Del., assignor to E. I. du Pont de Nemours and Company, Wilmington, Del., a corporation of Delaware Filed Feb. 14, 1961, Ser. No. 89,115
10 Claims. (Cl. 317—234)

Figure 1:
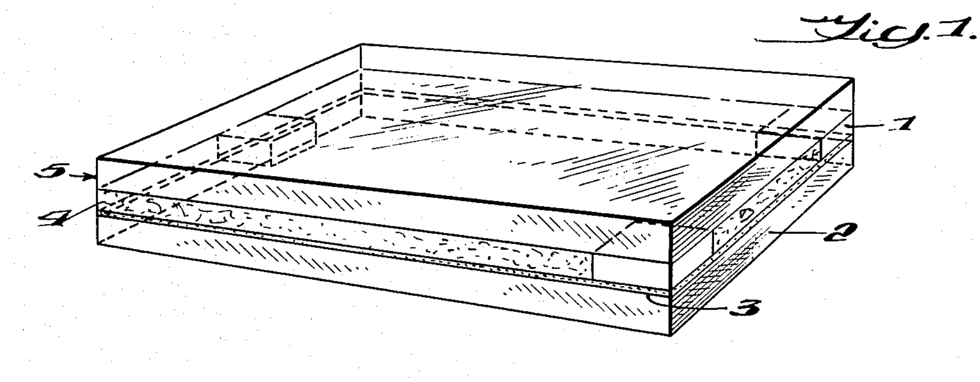

This invention is directed to non-ohmic semi-conductors. In particular the present invention relates to a novel method of increasing the resistivity and improving the non-ohmic characteristics of organic ion radical salts, and to improved electronic devices (varistors) based thereon.

Semiconductors, as conductors of electricity, lie between the good conductors (the metals) and the poor conductors (the insulators). Broadly, semiconductors include those substances having resistivities in the range $10^{10}$ to $10^{-3}$ ohm-cm. (the reciprocal of conductivity). Such property is characteristic of a wide variety of electronic devices including thermistors, photoelectric devices, transistors, varistors, etc., as more fully described by John N. Shive in "Semiconductor Devices," D. Van Nostrand Company Inc., New Jersey, 1951. This invention is particularly concerned with varistors, i.e. variable resistors, those semiconductors which, under suitable conditions of electrical contact, show non-ohmic resistance to the flow of current; in other words, the resistance to current flow varies with the applied voltage. In general, the relationship between the voltage (V) and the current (I), is given by the equation $I=KV^n$, where K is a constant depending on the geometry of the unit and the exponent $n$ indicates whether the behavior of the unit is ohmic ($n=1$) or non-ohmic ($n$=less than or greater than 1).

This invention is concerned with varistors for low power circuitry, particularly varistors of the symmetrical type, that is varistors operating non-ohmically at low voltages and having non-ohmic characteristics that are the same for both directions of the applied voltage. The existing commercial silicon carbide type symmetrical varistors (made from ceramic-like inorganic materials, by sintering at high temperatures) are designed primarily for high power circuitry. There thus exists a need for easily fabricated varistors showing significant non-ohmic behavior at relatively low voltages, say in the 0.1–10 volt range. Also, it is desirable to have such material that is easily fabricated, handled and incorporated into miniaturized circuitry, for example by simple "printing" or "painting" techniques.

Recently, semiconductor properties have been disclosed for charge transfer complexes and ion radical salts obtained by the interaction of organo and/or organo-inorganic Lewis acids with Lewis bases, and it has been proposed to employ such of these semiconductors that exhibit detectable paramagnetic resonance absorption in the solid state as energy control or energy transfer circuit components in the preparation of electronic devices. Properly fabricated, these substances can show significant non-ohmic properties.

It is, therefore, an object of this invention to provide a novel method for improving the resistivity and non-ohmic behavior of certain ion radical salts as hereinafter described. Another object is to provide new and novel varistors having improved non-ohmic characteristics, comprising heat-treated ion radical salts as hereinafter described. Still another object is to provide new varistors that have high resistivities, are ohmic at low voltages and non-ohmic above a relatively low threshold voltage. It is also a further object to provide a direct and inexpensive method of making printed or painted electronic circuits having non-ohmic semiconductor elements, which method comprises heating and melting and shaping in place in said circuit, an ion radical salt as hereinafter described. Further objects are to provide such printed circuits as new electronic devices and to advance the art of ion radical salts and non-ohmic semiconductors.

These and other objects will become apparent in the following description and claims.

More specifically, the present invention is directed to a solid non-ohmic semiconductor which consists essentially of a heat-treated ion radical salt obtained by melting and resolidifying an ion radical salt composition comprised essentially of cations $M^+$, anion radicals $(A)\cdot^-$, and molecular A, in such proportions that the average salt structure is predominantly $M^+(A)\cdot_2^-$, where $M^+$ is a univalent cation having an effective radius of at least about 3 Angstrom units; A is the tetracyanoquinodimethan moiety (TCNQ) or an alkyl substituted TCNQ, the (—) sign indicating the anionoid character of the quinodimethan moiety, the (·) indicating the odd electron character of said salt to the effect that the average structure exhibits a detectable paramagnetic resonance absorption in the solid state.

An embodiment of this invention includes, as an article of manufacture, a varistor comprising the heat-treated product as heretofore described and electrically conductive means in contact therewith.

The present invention is based on the discovery that the heat treatment method of this invention, applied to the ion radical salts, significantly and unexpectedly increases the resistivity of the salt and extends its non-ohmic range of behavior. This is surprising since such improvements cannot be accomplished by mere compacting of the material or by use of a single crystal of the salt. Compared to these other techniques, the present novel method further increases the low voltage ohmic resistance (usually from a value on the order of an ohm to about $10^2$ to $10^6$ ohms) with the result that the non-ohmic threshold voltage is reduced and the non-ohmic range substantially extended, e.g. to over a decade or more of current (or voltage) as given by the relationship $I=KV^n$. Threshold voltages in the heat treated salts of the order of 0.2 to 1.0 are readily reached, with the non-ohmic range extending upwards to about 10 to 12 volts, which is roughly the upper useful limit at which the current usually begins to increase more steeply with voltage due to Joule heating (thermistor behavior) to eventual burn out. The increase in the exponent $n$ may be several fold the ohmic $n=1$, in the 1 to 10 volt range, which is of particular advantage in present day miniaturized circuitry. The new heat-treated ion radical salts are normally symmetrically non-ohmic. However, they may be made unsymmetrical by affixing thereto electrodes of different materials.

In its broader scope, the method of the present invention comprises heating to melt, then cooling to resolidify. Temperatures of at least 100° C. and as high as 400° C. are required to bring the starting salt composition to the molten state. The time to reach melting and for holding the salt molten is coordinated with the temperature such that the ion radical salt, in the resolidified state, has the desired degree of resistivity and non-ohmic character. The duration of heating may vary widely, from seconds to minutes or more, depending on the particular ion radical salt, its heat capacity, melting point, thermal stability, the gross size of the sample and its degree of subdivision, and on the desired degree of enhancement in resistivity and non-ohmic character. A preferred technique is a flash melting wherein the sample is rapidly heated to melting, is held molten briefly and may be shaped, then resolidified by quenching. The mass may be shaped as desired in the molten or in the quenched (resolidified) state. However, an important aspect of the invention is the shaping of the heated ion radical salt in the molten state so that it resolidifies to the dimensions (i.e. thickness, surface area) called for by the particular circuit involved. For example, in-place-fabrication may be effected by placing a sample of the ion radical salt between spaced electrodes to be joined in the circuitry and the resulting unit heated, as in an oven, to cause melting of the salt, the melt filling the space between the electrode materials. Finally the unit is quenched, e.g. in a stream of cool air, to produce the finished varistor element. A variation involves heating the electrode material to a temperature sufficient to cause melting of the solid ion radical salt, and dipping the heated element into the (preferably finely powdered) salt, whereby the salt is melted on contact, forming a thin uniform coating on the electrode material, and is finally resolidified as the electrode material cools. The temperature of the heated electrode material is not critical, provided it is at least sufficient to melt the salt on contact with its surface without completely decomposing it or otherwise rendering it useless as a semiconductor. The temperature will also depend on the nature of the electrode material (e.g. its heat capacity), the melting point and stability of the ion radical salt and on the thickness of the semiconductive layer it is desired to build up on the surface of the conductive material. For low voltage varistors, thin coatings of the order of 1 to 20 mils, preferably up to 10 mils thick, are desirable; such are readily obtained.

Fabrication of the electronic circuit elements comprising the heat-treated ion radical salts of this invention is illustrated in the accompanying representative examples.

From a manufacturing standpoint, the present invention offers the advantage of easy shaping and conforming of the semiconductor material to a predetermined space between the conductive electrodes. Also, the resolidified salt is normally obtained as a contiguous coating on the electrode material, of obvious advantage over a coating of compacted crystals or a single crystal which may require special care in its mounting and installation in the circuitry.

The heat-treated ion radical salts produced according to the present invention are suitable as variable resistors in feedback circuits, as voltage limiters in D.C. circuits (for switchboard lamps, relay coils, key telephones, thermistors), for back voltage protection (for diodes and transistors), and for regulating voltages in A.C. circuits (for oscillators and bridges). They may also be used to give percussive effects in a Thomas organ. They are particularly suited for use in low voltage circuits.

The preferred starting ion radical salt will be comprised essentially of $M^+(A)\cdot_2^-$, melt below about 300° C., and have a resistivity of less than about $10^4$ ohm-cm. before the heat treatment (the resistivity of the heat-treated product will ordinarily range from $10^4$ to $10^8$ ohm-cm.). These salts are obtained by the reaction of 7,7,8,8,-tetracyanoquinodimethan (R=H; called TCNQ)

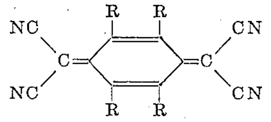

or an alkyl substituted 7,7,8,8,-tetracyanoquinodimethan (R=one or more $C_1$–$C_8$ alkyl radicals, the rest H; called alkyl-TCNQ), with a Lewis base which by loss of an electron to a TCNQ (or alkyl-TCNQ) moiety furnishes a univalent cation, $M^+$, having an effective radius of at least about 3A. Iodide salts, $M^+I^-$, where $M^+$ and $I^-$ represent crystallographically distinct ionic entities, are convenient sources of both $M^+$ and the electron to be transferred to the TCNQ or alkyl-TCNQ unit.

In the salt of average structure, $M^+(TCNQ)\cdot_2^-$, the anionic component can be regarded as having been formed by the addition of an electron to the unsaturated TCNQ moiety to yield $TCNQ\cdot^-$, followed by coupling or by complexation of this anion with another TCNQ molecule. In effect, the odd electron, which contributes the negative charge (—) and which is represented by the dot (·), is shared by two TCNQ molecules. $M^+(TCNQ)\cdot_2^-$ may also be represented as $M^+(TCNQ\cdot^-)(TCNQ)$, where (−) and (·) have the significance given above and TCNQ is an uncharged molecule. Broadly more or less than two TCNQ units may be involved in the over-all salt composition. In other words, more or less than a mole of TCNQ may be in intimate association with $M^+TCNQ\cdot^-$. Thus, along with $M^+(TCNQ)\cdot_2^-$ (the preferred average salt structure of the starting material to be heat-treated) there may be present additional quantities of $M^+TCNQ\cdot^-$ or of TCNQ, so that broadly the average structure may be represented by $M^+(TCNQ)\cdot_p^-$, where $p$ is a positive number greater than 1. Usually $p$ will be at least about 1.5 and not more than about 3, with about 2 preferred. The average salt compositions defined by $p$ above can be prepared by employing the corresponding molar amounts of TCNQ in the reaction with $M^+I^-$, or by adding as such TCNQ or $M^+TCNQ\cdot^-$ or a salt of $M^+$ e.g. $M^+I^-$ to $M^+(TCNQ)\cdot_2^-$ before or during the heat treatment.

The reaction of $M^+I^-$ with TCNQ is conveniently carried out in an inert solvent at ordinary temperatures and the ion radical salt recovered by crystallization from the solution or by removal of the solvent. Suitable solvents include halogenated hydrocarbons ($CHCl_3$, $CH_2Cl_2$), ketones (acetone, methyl ethyl ketone), nitriles (acetonitrile, propionitrile), ethers (butyl ether, tetrahydrofuran, dioxane, ethylene glycol dimethyl ether) and mixtures thereof. The reactants are mixed with the solvent, preferably at elevated temperatures up to about 100° C., then allowed to cool. The ion radical salts are normally obtained as deeply colored crystalline solids, showing detectable paramagnetic absorption i.e. having odd-electron character as indicated by the dot (·) in the formula given above, and melting up to about 400° C. The ion radical salts from the alkyl-substituted TCNQ molecules tend to have lower melting points (usually below 200° C.) than those from TCNQ (usually 200–300° C.).

Since the conduction of the electricity of the ion radical salts has been found to be essentially electronic (negligibly ionic), the nature of the cation, $M^+$, is believed not critical, provided it is sufficiently large to form, in association with the radical anions $(A)\cdot_p^-$ described above, a normally solid heat-tractable ion radical salt, $M^+(A)\cdot_p^-$, preferably melting not higher than about 300° C. By sufficiently large is meant having an effective radius (i.e. van der Waal's radius) of at least about 3 Angstroms (A.), and which may be as large as 15–20 A. In contrast, comparable salts with substantially smaller cations, e.g. salts wherein $M^+$ is $Cs^+$ ($r$=1.69A.) or $Na^+$ ($n$=1.00A.) do not give heat-treated products with the desired non-ohmic properties.

Further, $M^+$ is a polyatomic cation, more specifically a cation $G_mQ^+$ where G is a substituent group; Q is an element of groups V and VI of the periodic table and *m* is 3 or 4 depending on the valence of Q, being 3 where Q is from group VI, and 4 where Q is from group V; in other words, *m* is 1 plus the lowest stable valence of the element Q. Representative Q elements are: N, P, As, Sb, O, S and Se.

G may be H, or an organic radical broadly, i.e. aliphatic, cycloaliphatic, aromatic or heterocyclic, with at least one of G being organic and preferably all organic. Preferably G will be a hydrocarbon, oxahydrocarbon, thiahydrocarbon or an azahydrocarbon radical, and preferably will contain up to 18 atoms for reasons of economy and availability of such groups. More usually G will be an alkyl, cycloalkyl, or aryl radical, which may be joined with at least one other G group so as to constitute along with the hetero atom Q a heterocyclic ring. It will be recognized that the cations $G_mQ^+$ are broadly and generically onium radicals, i.e. pyrrylium, sulfonium, selenonium, phosphonium, arsonium, stibonium and ammonium radicals. Preferred are the quaternary onium salts of Group V elements N, P, As and Sb. Typical of such onium radicals are the cations: tetramethyl ammonium, ethyltrimethyl ammonium, tetraoctyl ammonium, methyl tri-n-propyl ammonium, phenyltrimethyl ammonium, tetra-n-propyl ammonium, triethylmethyl ammonium, tetraethyl ammonium, N-ethyl-pyridinium, 1-methyl-4-cyanopyridinium, quinolinium, N-methylquinolinium, N-propylquinolinium, 1-methyl-4-cyanoquinolinium, N-ethylquinolinium, tetraphenylphosphonium, methyl triphenyl phosphonium, tetrabutyl phosphonium and ethyl triphenyl phosphonium; and, the corresponding quaternary arsonium and stibonium radicals corresponding to said phosphonium radicals; triphenyl sulfonium, triphenyl selenonium; 2,4,6-triphenyl pyrrylium.

The following data taken from the review article, by K. H. Stern and E. S. Amis, "Ionic Size," Chemical Reviews 59, 45 (1959), illustrates the effective sizes of the cations.

| $G_mQ^+$ | van der Waal's radius, A. |
|---|---|
| Tetramethyl ammonium | 3.3 |
| Tetraethyl ammonium | 4.65 |
| Tetra-n-propyl ammonium | 5.9 |
| N-methylpyridinium | 4.13 |
| Triphenyl methyl carbonium | 7.0 |

It should be apparent from a consideration of the structure of the foregoing representative 'onium radicals that all have effective radii of at least about 3 A. It will also be apparent that replacing the central atom in the above cations (i.e. N in the ammonium and pyridinium) by another group V–VI atom will but slightly alter the radius of the cation (the bulk of which is largely determined by the attached group) and will have a relatively small effect on the salt structure.

Mixtures of salts may be used, i.e. salts composed of one or more different cations with one or more different radical anions.

Representative examples illustrating the present invention follow.

I. *Preparation of starting materials.*—7,7,8,8-tetracyanoquinodimethan and the corresponding ring-alkylated quinodimethans can be prepared by condensing the appropriate 1,4-cyclohexandione with malononitrile, followed by oxidizing (dehydrogenating) the resulting 1,4-bis(dicyanomethylene)cyclohexane to the 1,4-bis(dicynomethylene)cyclohexadiene. The condensation is effected in the presence of a catalyst—an acid or base, or a salt which ionizes in water to give an acid or basic solution, which is useful in the well-known Knoevenagel and aldol condensations. Water is a product of the condensation and it is preferred to remove it from the reaction zone, as by distillation (including azeotropy). The oxidation of the 1,4-bis(dicyanomethylene)cyclohexanes to the 1,4-bis(dicyanomethylene)cyclohexadienes can be effected by oxidation with air, oxygen, peroxides, selenium dioxide and by halogenation and dehalogenation, as illustrated in the following examples.

The $C_1$–$C_8$ alkyl-substituted 1,4-bis(dicyanomethylene) cyclohexadienes are prepared from the $C_1$–$C_8$ substituted 1,4-cyclohexandiones. Examples include: 2,3-dimethyl-1,4-bis(dicyanomethylene)cyclohexadiene; 3,3,5-trimethyl-1,4-bis(dicyanomethylene)cyclohexadiene; and the analogous 2,3,5,6-tetramethyl-, 2-n-octyl, 2-isopropyl and 2,3,5,6-tetrakis-n-octyl-1,4-bis(dicyanomethylene)cyclohexadienes.

The alkyl substituted cyclohexandiones for preparation of the above dienes are prepared conveniently by the Birch reduction with sodium and liquid ammonia in ethanol of the diethers (e.g. bismethyl ether) of the corresponding C-alkyl hydroquinones.

*1,4-bis(dicyanomethylene)cyclohexadiene, i.e., 7,7,8,8-tetracyanoquinodimethan* (TCNQ)

(A) A mixture of 100 parts of 1,4-cyclohexandione and 119 parts of malononitrile was heated at steam bath temperatures until significant melting had occurred, at which point a solution of one part of β-alanine in 200 parts of water was added, and heating continued at steam bath temperatures (with occasional swirling) until the formation of a few crystals was noted. An exothermic reaction then began, and, when it had become sufficiently vigorous to cause the reaction mixture to boil, the reactor was placed in an ice/water bath. When boiling had ceased, the reactor was removed from the cooling bath and allowed to cool to room temperature. The nearly solid mass was filtered, washed with water until the washings were colorless, air-dried, and then washed with diethyl ether until the washings were colorless. After air-drying, there was thus obtained 180 parts of 1,4-bis(dicyanomethylene)cyclohexane as white crystals melting at 216–217° C.

(B) A mixture of 12 parts of 1,4-bis(dicyanomethylene)cyclohexane, 156 parts of acetonitrile, and 19.2 parts of bromine in a glass reactor was cooled with stirring using an external ice/water bath to 10° C. under an atmosphere of nitrogen. The reaction vessel was maintained in the ice/water bath, and a solution of 18.8 parts of pyridine in 23.5 parts of acetonitrile was added over a period of 15 minutes with continued stirring at such a rate that, with continued external cooling, the temperature of the reaction mixture remained at 0° C. The reaction mixture was then stirred an additional 30 minutes at 0° C., at which point the cooling bath was removed and the reaction mixture allowed to warm to 20° C. over a period of one hour, at which point 300 parts of cold water was added and the resultant solid removed by filtration. The filter cake was washed with water and air-dried, thereby affording 12.1 parts of crude TCNQ as a yellow solid melting at 293–295° C. with decomposition. After recrystallization from acetonitrile, there was obtained 9.3 parts of pure TCNQ as rust-colored crystals melting at 293.5–296.0° C.

As expressly stated heretofore, the present invention is generic to the 1,4-bis(dicyanomethylene)cyclohexadienes and -alkylcyclohexadienes. The preceding examples illustrate the preparation of a representative 1,4-bis(dicyanomethylene)cyclohexadiene.

The following illustrate preparation of a typical alkyl-substituted 1,4-bis(dicyanomethylene)cyclohexadiene.

*2-methyl-1,4-bis(dicyanomethylene)cyclohexadiene (MeTCNQ)*

A. To 43 parts of 2-methyl-1,4-cyclohexandione was added 46.2 parts of malononitrile and 0.5 part of β-alanine dissolved in five parts of water. The mixture was heated for two hours at steam bath temperatures and then let stand overnight at room temperature. The solid product was washed with water and then with diethyl ether and air-dried. There was thus obtained 54 parts of crystalline 2-methyl-1,4-bis(dicyanomethylene)cyclohexane melting at 186–194° C. after recrystallization from ethyl acetate.

B. To a solution of 20 parts of 2-methyl-1,4-bis(dicyanomethylene)cyclohexane and 28.8 parts of bromine in 290 parts of acetonitrile cooled with an external ice/salt bath was added 28.3 parts of pyridine slowly over a period of about twenty minutes with stirring while maintaining the external cooling. The addition completed, the reaction mixture was stirred for an additional one-half hour with cooling and then for two more hours at room temperature. 555 parts of cold water was added and the resultant solid product was removed by filtration, washed with 230 parts of cold water, then dissolved in 706 parts of acetonitrile. The solution was filtered, heated with decolorizing charcoal, filtered, cooled to room temperature, and concentrated to a volume corresponding to 50 parts of water under a stream of nitrogen. On filtration and air-drying, there was thus obtained 3.6 parts of MeTCNQ as dark tan microcrystals melting at 193–195° C.

II. *Ion radical salts.*

EXAMPLE 1

A solution of 0.625 part of triethylmethylammonium iodide in a minimum of acetonitrile was added to a warm solution of one part of TCNQ in 160 parts of anhydrous tetrahydrofuran. A brilliant, deep-green color immediately developed. The reaction mixture was allowed to stand at room temperature for 1.5 hours and then concentrated under reduced pressure. When about 30 parts of solvent remained, a small amount of anhydrous diethyl ether was added, and the resultant mixture was filtered. There was thus obtained 0.84 part of $$Et_3MeN^+(TCNQ)\cdot_2^-$$

i.e. the 2/1 tetracyanoquinodimethan/triethylmethylammonium charge-transfer compound, as dark crystals, melting at 265–274° C. after recrystallization from acetonitrile.

EXAMPLE 2

To a hot (60° C.) solution of two parts of TCNQ in 180 parts of acetonitrile was added with occasional swirling a room-temperature solution of four parts (excess) of methyl triphenyl phosphonium iodide in about 50 parts of acetonitrile. The reactor was closed and placed in a Dewar flask. After two minutes, a seed crystal of the 2/1 tetracyanoquinodimethan/methyltriphenylphosphonium charge-transfer compound, i.e. $MePh_3P^+(TCNQ)\cdot_2^-$ was added and the flask again sealed and the Dewar covered. The reaction mixture was allowed to stand under these conditions for 16 hours and the resultant solid black crystals removed by filtration and washed rapidly with two about 10-part portions of acetonitrile and air-dried to yield two parts of the charge-transfer compound as black prisms melting at 231–233° C.

EXAMPLE 3

The preparation of Example 2 was repeated, substituting a solution of 4.0 parts (excess) of ethyltriphenylphosphonium iodide for the methyltriphenylphosphonium iodide, varying further only in that the ethyltriphenylphosphonium iodide solution was added at 35° C. There was thus obtained 1.4 parts of the 2/1 tetracyanoquinodimethan/ethyltriphenylphosphonium charge-transfer compound, i.e. $EtPh_3P^+(TCNQ)\cdot_2^-$ as black plates melting at 223–225° C.

EXAMPLE 4

The preparation of Example 3 was repeated, substituting 4.66 parts (100% excess based on TCNQ) of tetraphenylphosphonium iodide in 94 parts of acetonitrile for the acetonitrile solution of the ethyltriphenylphosphonium iodide. After standing for 40 hours in the Dewar, the reaction mixture was filtered and handled in the same way to afford 1.26 parts of the 2/1 tetracyanoquinodimethan/tetraphenylphosphonium charge-transfer compound as black rod crystals melting at 228–237° C.

EXAMPLE 5

The preparation of Example 2 was repeated, substituting 4.4 parts (2.0 molar proportions based on TCNQ) of methyltriphenylarsonium iodide for the methyltriphenylphosphonium iodide. After processing otherwise identically as in Example 2, there was thus obtained two parts of the 2/1 tetracyanoquinodimethan/methyltriphenylarsonium charge-transfer compound as black, medium-large prisms melting at 224–227° C.

EXAMPLE 6

To a hot (60° C.) solution of 0.612 part of TCNQ in about 55 parts of acetonitrile in a glass reactor was added a solution (60° C.) of 0.789 part (two molar proportions based on the TCNQ) of trimethylphenylammonium iodide in about 16 parts of acetonitrile. The reactor was immediately closed, and after two minutes a seed crystal of the 2/1 tetracyanoquinodimethan/trimethylphenylammonium charge-transfer compound was added. The closed reactor was then placed in a Dewar flask and allowed to stand for 24 hours. The resultant black prisms were removed by filtration, washed twice with acetonitrile, and air-dried. There was thus obtained 0.46 part of the $Me_3PhN^+(TCNQ)\cdot_2^-$ compound melting at 227–239° C.

EXAMPLE 7

The preparation of Example 2 was repeated, substituting 4.62 parts (2.0 molar proportions based on the TCNQ) of ethyltriphenylarsonium iodide for the 4.0 parts of the methyltriphenylphosphonium iodide of Example 2. There was thus obtained 1.6 parts of the 2/1 tetracyanoquinodimethan/ethyltriphenylarsonium charge-transfer compound as medium-sized black crystals, melting at 212–219° C.

EXAMPLE 8

To a hot (60° C.) solution of 1.02 parts of TCNQ in 58.5 parts of acetonitrile was added a hot (60° C.) solution of 2.78 parts (2.0 molar proportions based on the TCNQ) of tetraphenylstibonium iodide in about 16 parts of acetonitrile. The resulting mixture was allowed to stand at room temperature for one hour and the acetonitrile solvent removed by heating at steam bath temperatures until the volume of the liquid had been reduced to about 40% of its initial value. A seed crystal of the 2/1 tetracyanoquinodimethan/tetraphenylstibonium charge-transfer compound was then added to the hot solution which was then let cool to room temperature. On filtration, there was thus obtained 0.87 part of the 2TCNQ/TPSb charge-transfer compound as black rods melting at 219–220° C.

EXAMPLE 9

To a hot (60° C.) solution of 1.02 parts of TCNQ in 90 parts of acetonitrile was added with occasional swirling a hot (60° C.) solution of 2.12 parts (an equimolar proportion based on the TCNQ) of triphenylselenonium iodide in about 35 parts of acetonitrile. A seed crystal of the ½ tetracyanoquinodimethan/triphenylselenonium charge-transfer compound, prepared in a previous similar experiment, was added and the glass reactor sealed and placed in a large Dewar flask and allowed to cool spontaneously to room temperature in the closed Dewar. After 30 hours, the resultant crystalline black solid was removed by filtration, washed rapidly with acetonitrile, and air-dried. There was thus obtained 1.38 parts of the 2TCNQ/TPSe charge-transfer compound as clusters of tiny black prisms melting at 240–245° C.

EXAMPLE 10

To a hot filtered solution of 2.04 parts of TCNQ in about 180 parts of acetonitrile was added a solution of 2.93 parts (0.75 proportion based on the TCNQ) of triphenylsulfonium iodide in 25 parts of acetonitrile. The reaction vessel was placed in a Dewar flask and the reaction mixture then seeded with a crystal of the 2/1 TCNQ/triphenylsulfonium charge-transfer compound and the Dewar then closed. After 24 hours at room temperature as the reaction mixture cooled under these conditions, it was filtered and the solid thus obtained washed with acetonitrile and air-dried. There was thus obtained 2.2 parts of the 2/1 TCNQ/triphenylsulfonium charge-transfer compound as ribbon crystals melting at 235–240° C.

EXAMPLE 11

To a hot solution of 2.0 parts of TCNQ in about 180 parts of acetonitrile was added a solution of 2.21 parts (1.0 molar proportion based on the TCNQ) of N-methylpyridinium iodide in about 25 parts of acetonitrile. The reaction mixture was handled as in Example 10. After standing for 20 hours, slowly cooling, the resultant solid product was removed by filtration. There was thus obtained 0.46 part of the 2/1 TCNQ/N-methylpyridinium charge-transfer compound as layered, multirod crystals melting at 249–280° C.

EXAMPLE 12

To a hot solution of 1.00 part of TCNQ in about 75 parts of acetonitrile was added a hot solution of 1.1 parts (0.5 molar proportion based on a 2/1 basis) of N,N'-pentamethylene-bis(trimethylammonium iodide) in about 75 parts of acetonitrile. The reaction vessel and mixture were handled as in Example 10. After slowly cooling under those conditions for 25 hours, the solid product was removed by filtration. After drying there was thus obtained 0.61 part of the 2/1 TCNQ/N,N'-pentamethylene-bis(trimethylammonium) charge-transfer compound as purplish black rods melting at 280–300° C. with decomposition.

EXAMPLE 13

To a hot solution of 0.612 part of TCNQ in about 55 parts of acetonitrile was added a solution of 0.939 part (one molar proportion based on the TCNQ) of tetra-n-propylammonium iodide in about 15 parts of acetonitrile. The reaction mixture was allowed to cool slowly to room temperature and let stand two weeks under these conditions. The acetonitrile solvent was then removed by distillation until only a few parts were left. The resultant solid was removed by filtration and dried. There was thus obtained 0.05 part of the 2/1 TCNQ/tetra-n-propylammonium charge-transfer compound as black ribbon crystals.

EXAMPLE 14

Following the methods of the preceding representative examples, the ion radical salts listed hereinafter are also obtained as solids melting in the range 200–300° C.:

(a) (N-methylquinolium)$^+$(TCNQ)$\cdot_2^-$ (b) 2,4,6-triphenylpyrrylium, i.e.

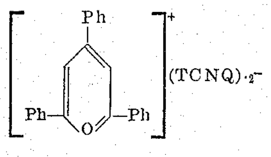

(c) (quinolinium)$^+$(TCNQ)$\cdot_2^-$

EXAMPLE 15

To a hot (about 70° C.) solution of 0.36 part of MeTCNQ in 9.4 parts of acetonitrile was added a solution of 0.79 part of methyltriphenylarsonium (MeTPAs) iodide in 5.5 parts of acetonitrile. The reaction mixture immediately turned dark blue-green and was heated briefly (about 70° C.) and then allowed to stand at room temperature under nitrogen. The volume of the reaction mixture was then reduced to that corresponding to ten parts of water under a stream of nitrogen at room temperature and the resulting solid removed by filtration. After drying, there was thus obtained 0.35 part of the 2/1 MeTCNQ/MeTPAs charge-transfer compound as small, blue-black, rod-like crystals melting at 171–173° C.

In a substantially identical manner there was obtained from 0.22 part of MeTCNQ in 5.5 parts of acetonitrile and 0.41 part of methyltriphenylphosphonium iodide (MeTPPI) in four parts of acetonitrile, 0.25 part of the 2/1 MeTCNQ/MeTPP charge-transfer compound as small, blue-black, rod-like crystals melting at 180–182° C.

In a substantially identical manner, from 0.440 part of MeTCNQ in 7.8 parts of acetonitrile and 0.46 part of triethylammonium iodide (TEAI) in 5.5 parts of acetonitrile, there was obtained 0.22 part of the 2/1 MeTCNQ/TEA charge-transfer compound as a dark blue, fluffy solid melting at 173–176° C.

*Ion radical salts heat treated according to the method of the invention*

EXAMPLE 16

This example illustrates the method of the invention applied to the preparation of a varistor element using ion radical salts as tabulated below and electrically conductive glass plates as the electrode materials to be affixed to the heat-treated ion radical salts.

With reference to FIGURE 1, three insulating spacers (mica) 1, 5 mils thick, are placed on the conductive side of an electrically conductive flat glass plate 2. The conductive layer 3 of the glass plate is a thin semi-transparent (~90% transparent) layer of mixed stannous-stannic oxide semiconductor having a surface resistivity of about 100 ohms/sq. cm. An ion radical salt 4, as given below, is evenly distributed over 2.5 square centimeters of the surface of the glass, in quantity corresponding to about 25 mg./cm.$^2$ or sufficient to fill the 5 mil thick space between the plates. A second glass plate 5 identical to the first is placed over the powder on the first, one glass is rotated against the other slightly (to level the powder further), then the two are clamped together and the unit is placed in a furnace preheated at 500° C. At the first sign of melting of the powdered salt (melting occurs within 60 seconds), the unit is removed and placed on a cool metal plate at room temperature. After the unit has cooled, the clamp is removed, and the unit tested for electrical properties using a D.C. or A.C. source of voltage, a voltmeter and an ammeter. (Conveniently a General Radio type No. 1650–A "Orthonull" impedance bridge as a voltage source, a General Radio type No. 1230–A D.C. amplifier and electrometer as a voltmeter, and a Simpson 269 volt-ohm-microammeter as an ammeter.) The results are tabulated below in terms of low voltage resistivity and the degree of non-ohmicity, as given by the exponent $n$ in the equation $I=KV^n$. In general the threshold voltage was in the range 0.2 to 1.0 volt, and non-ohmic behavior was evident above the threshold voltage in each case, up to 10 volts (which appears to be the upper limit at which Joule heating became evident in that the current slowly increased with time at a fixed voltage).

It should be noted that the resistivity of the heat-treated salt is significantly greater than that of the original, the ratio of heated to untreated being usually at least several powers of 10 and as high as $10^9$.

RESISTIVITY AND NON-OHMICITY OF HEAT-TREATED ION RADICAL SALTS

| Test | Ion Radical Salt of Example | Resistivity, $\rho$ | | | Ratio* Heat-Treated to untreated, $\rho$ | Exponent $n$, in $K=V^n$ |
|---|---|---|---|---|---|---|
| | | Single Crystal | Powder Compaction | Heat-treated | | |
| A | 2 | 60, 600, $10^5$ | | $1.2\times10^6$ | $7\times10^3$ | 1.62 |
| B | 5 | 57, 900, $1.65\times10^5$ | | $4\times10^5$ | $7\times10^3$ | 1.45 |
| C | 7 | 1.9, $6.6\times10^3$ | | $5\times10^6$ | $2.5\times10^6$ | 1.6 |
| D | 9 | | 416 | $7\times10^5$ | $2\times10^3$ | 1.67 |
| E | 10 | 0.86 | | $1.5\times10^6$ | $2\times10^6$ | 1.77 |
| F | 14(b) | | 4.6 | $5\times10^5$ | $10^5$ | 1.8 |
| G | 14(c) | 0.01 | 0.2 | $2\times10^7$ | $2\times10^7$ | 2.3 |

*The single crystals are anisotropic. The ratio of the heat-treatment resistivity to the smallest single resistivity of the untreated single crystal form is chosen because the current seeking the path of least resistance tends to flow in that direction. In this unit the ratio of area to thickness of the semiconductor layer is $2\times10^2$; the resistivities above are $2\times10^2$ the observed resistances in ohms.

Similar results are obtained on using flat metal plates as electrodes instead of the conductive glass, but with some sacrifice in the value of the non-ohmic exponent, *n*. Also instead of mica, glass, etc. may be used as insulators, with good non-ohmic results being obtained at thicknesses of as low as 0.1 to as high as 20 mils. It should be noted also, that the quantity of salt used in each case may vary slightly depending for example on salt density. Also, the salt can be coated on the glass as a spray or painting in a volatile carrier liquid which can be flashed off substantially completely at elevated temperatures.

The time of heating, as well as the temperature of the oven can also be varied to obtain variations in results. To obtain reproducible results with the same materials, i.e. to produce units with closely similar electrical properties, time and temperature should be carefully coordinated.

The rate at which the ohmic resistance increases at a particular operating temperature can be modified by varying the composition of the ion radical salts $M^+(TCNQ)\cdot_p^-$ such that $p$ is less than 2, e.g. 1.5 or greater than 2, e.g. 3. Also excess cation $M^+$ or TCNQ can be added to decrease the rate of ohmic resistance increase during heating. This provides a means of controlling the process, to achieve more uniform results, and of providing various final compositions with a range of properties. For example, on repeating test A of Example 16 with 20% wt. triphenylmethylphosphonium iodide added to the ion radical salt, and heating the glass cells at 500° C. for 30 seconds, the ohmic resistance became only 1400 ohms instead of 6000 ohms, both the cell with and without the additive becoming non-ohmic at voltages above 0.2 volt, with exponents, *n*, equal to 1.41 and 1.46 respectively. Similar results can be obtained by adding small amounts, e.g. 1–2% of TCNQ to the ion radical salt.

EXAMPLE 17

Figures 2, 3:
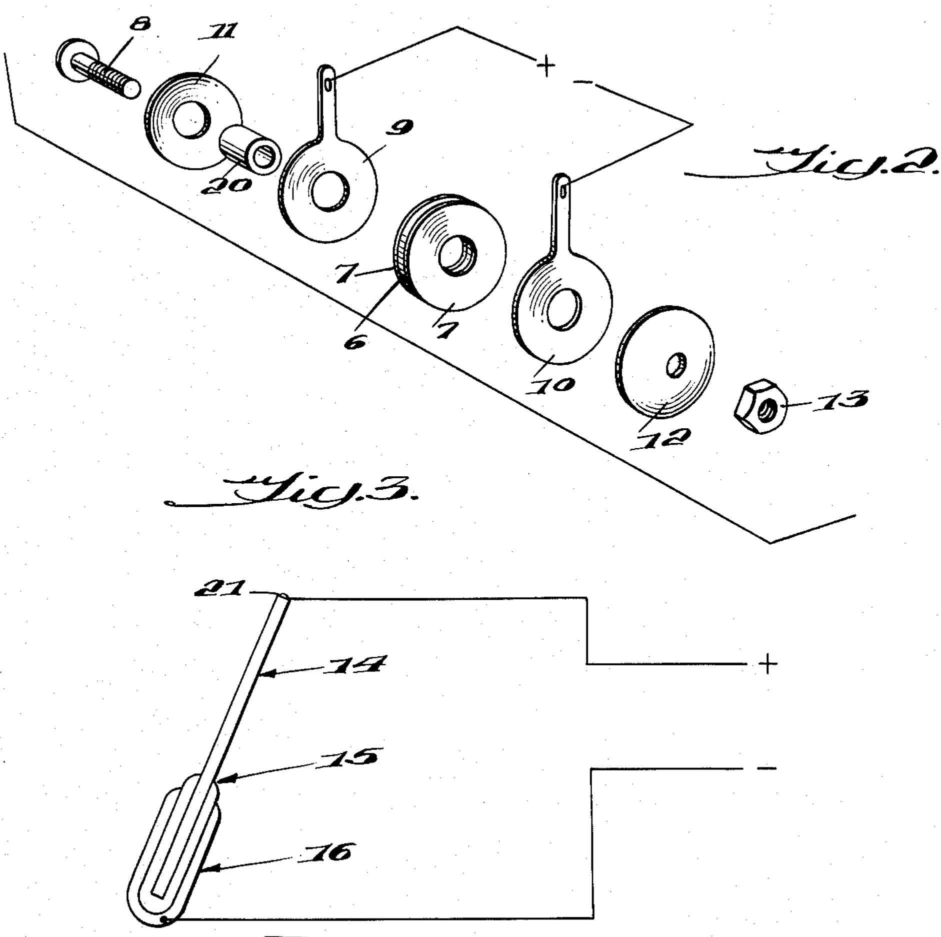

With reference to FIGURE 2, a varistor in the shape of a washer 6 was prepared by bringing powdered $$\phi_3P^+CH_3(TCNQ)\cdot_2^-$$

of Example 2 in a 30 ml. tall form glass beaker to its melting point on a hot plate. A ¾-in. lead washer with a ¼-in. centered hole, suspended by means of a thin wire was then lowered into the melt and quickly withdrawn. A dull, greenish-black coating of melted and resolidified ion radical salt 7 was observed on each side of the washer. Its average thickness was determined to be about 2.0 mils. The washer was then mounted in an A–815 varistor mounting assembly, manufactured by Victory Engineering Company, consisting of a threaded bolt 8 with an insulating sleeve 20, two washer-shaped contacts 9 and 10, two washer-shaped pressure plates 11 and 12, and a nut 13 adapted to engage the threaded portion of bolt 8 to engage all the parts of the varistor assembly in intimate contact as shown in FIGURE 2. The relation between D.C. current and applied D.C. potential difference for the A–815 varistor was then determined, using a General Radio type No. 1230–A D.C. amplifier and electrometer as a voltmeter and a Simpson 269 volt-ohm-microammeter as an ammeter. The above varistor proved to be ohmic (6400 ohms) at all test voltages up to 0.9 volts, and then deviated from Ohm's law at higher voltages according to the relation $I=KV^{1.67}$. Upon application of 6.0 volts, for instance, the varistor current had risen to 3.0 milliamperes, and the effective resistance had become 2,000 ohms.

EXAMPLE 18

A fluidized bed of $\phi_3P^+CH_3(TCNQ)\cdot_2^-$ powder was prepared by placing 160 grams of the powder, ground with mortar and pestle to just pass a 100-mesh screen, into the 3½ inch diameter cylinder of a Model A Vibro-Fluidizer, manufactured by the Armstrong Products Company of Warsaw, Indiana. Upon passing a stream of dry air upward through the powder at the rate of 5 cubic feet per hour and adjusting the lateral vibration to prevent geysering at the upper surface, it was observed that the height of the column of fluidized powder rose to 5 inches, about double is height at rest without air flow. Both large and small objects were dipped into the fluidized bed without incurring the usual resistance to penetration of a pile of powder.

With reference to FIGURE 3, a four-inch piece of bare copper wire 14, B and S No. 16 (64 mils diameter) was introduced into and heated in a furnace held at 500° C. for about one minute, and then was removed and dipped, while hot, into the fluidized bed to a depth of ¾ in. The heat capacity of the wire was such that only a thin layer 15 of the ion radical salt, slightly less than 1.0 mil thick, coated the wire, and was already solidified upon removing the wire from the bed. The coated end was then dipped into Du Pont conductive silver paint No. 4817 to form a second electrode 16, ½ inch in length, on top of the resolidified ion radical salt. Electrical contact 21 was then made to the bare copper wire and the silver paint electrode, and the unit was found to be ohmic (1550 ohms) up to 0.2 volt, but exhibited a deviation from Ohm's law according to the relation, $I=KV^{1.50}$, at higher voltages. Upon application of 1.2 D.C. volts, for instance, the current had risen to 2.2 ma., and the effective resistance had decreased to 550 ohms.

EXAMPLE 19

Figure 4:
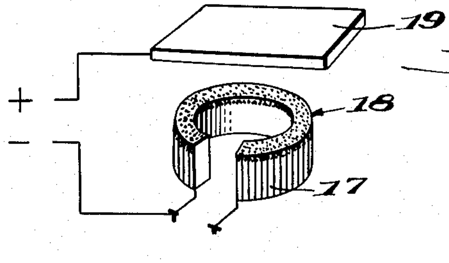

With reference to FIGURE 4, a wire-wound Ohmite vitreous enameled rheostat 17 potentiometer of 250 ohms resistance and 25 watt rating (Model H) was modified by removing its central shaft and resistance tap to leave a fixed 250 ohm resistance between two electrodes. It was then heated in a furnace held at 300° C. for a half hour, and dipped into the fluidized bed of Example 18 with the bare resistance wires downward. The heating and dipping was repeated twice more to build up a thick enough coating 18 of melted and resolidified $$\phi_3P^+CH_3(TCNQ)\cdot_2^-$$

to cover the exposed wires with a layer 1–2 mils thick. A flat brass plate 19 was then clamped on top of the coating, and the D.C. current-voltage relationship determined using the brass plate as one electrode and the electrode at one end of the 250 ohm potentiometer as the other. The unit was ohmic (0.5 megohm) at voltages below about 0.2 volt, and became a varistor obeying the equation $I=KV^{2.20}$ above 0.2 volt to voltages at least as high as 4.0 volts, its effective resistance dropping to 20,000 ohms at the latter voltage.

It has been found that the ohmic resistance and the power, $n$, in the expression $I=KV^n$ can be modified by establishing a potential difference between the two electrodes at the ends of the 250 ohm resistance winding. A 1.5 volt dry cell and a 1,000 ohm resistor were connected in series between these two electrodes, first with the 1.5 volt cell in such a direction as to make the new third electrode positive with respect to the potentiometer electrode used in the varistor test, and then negative. The bias between potentiometer electrodes was thus adjustable to +0.3 volt, −0.3 volt, or zero upon disconnecting the 1.5 volt dry cell from the circuit. The result is summarized in the following table.

| $V_{bias}$ | Ohmic Resistance | Power, $n$, in $I=KV^n$ |
|---|---|---|
| +0.3 v. | 1.0 megs | 2.43 |
| 0 | 0.5 megs | 2.20 |
| −0.3 | 0.15 megs | 1.85 |

Thus a potential drop can be established along one electrode of these varistors, producing an effect similar to the use of a self-heated cathode in a vacuum diode, i.e., the power, $n$, in the relation $I=IV^n$ can be increased (or decreased in the case of a negative bias).

It is understood that the preceding representative examples may be varied within the total teaching and disclosure of the present specification, as understood by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for preparing a solid non-ohmic semiconductor comprising (A) melting an ion radical salt until the resolidified ion radical salt's resistivity has been substantially increased, said ion radical salt comprised essentially of cations $M^+$, anion radicals $(A)^{\overline{\cdot}}$, and molecular A in such proportions that the average salt structure is essentially $M^+(A)\overline{\overline{p}}$, where $M^+$ is an 'onium cation having a central element taken from groups V and VI of the Periodic Table and having an effective radius of at least 3 and up to and including 20 Angstrom units; A is a member of the group consisting of a tetracyanoquinodimethan moiety (TCNQ) and a $C_1$–$C_8$ alkyl substituted TCNQ, said alkyl substituent attached to the quinodimethan moiety, the (−) sign indicating the anionoid character of the quinodimethan moiety, the (·) indicating the odd election character of said salt to the effect that the average structure exhibits a detectable paramagnetic resonance absorption in the solid state, and $p$ is a positive number greater than 1 and not more than about 3, and (B) resolidifying said ion radical salt.

2. The process of claim 1 wherein said ion radical salt is normally solid and melts below about 300° C.

3. The process of claim 1 wherein said ion radical salt is melted in the range of from about 100° C. to about 400° C.

4. The process of claim 1 wherein said ion radical salt is flash melted, held briefly in the molten state, and resolidified by quenching.

5. The process of claim 1 wherein said ion radical salt is placed between spaced electrodes and allowed upon melting to fill the space between said electrodes.

6. The process of claim 1 wherein $p$ is 2.

7. A process for preparing a solid non-ohmic semiconductor comprising (A) melting an ion radical salt until the resolidified ion radical salt's resistivity has been substantially increased, said ion radical salt comprised essentially of cation $M^+$, anion radicals $(A)^{\cdot-}$, and molecular A in such proportions that the average salt structure is essentially $M^+(A)\overline{\overline{p}}$, where $M^+$ is a polyatomic 'onium cation of the formula $G_mQ^+$, wherein G represents a substituent group containing up to 18 carbon atoms selected from the group consisting of hydrocarbon, oxahydrocarbon, thiahydrocarbon and azahydrocarbon, Q is an element taken from Groups V and VI of the Periodic Table and $m$ is an integer from 3 to 4 depending on the valence of Q, said cation having an effective radius of 3 and up to and including 20 Angstrom units; A is a member of the group consisting of a tetracyanoquinodimethan moiety (TCNQ) and a $C_1$–$C_8$ alkyl substituted TCNQ, said alkyl substituent attached to the quinodimethan moiety, the (−) sign indicating the anionoid character of the quinodimethan moiety, the (·) indicating the odd election character of said salt to the effect that the average structure exhibits a detectable paramagnetic resonance absorption in the solid state, and $p$ is a positive number greater than 1 and not more than about 3, and (B) resolidifying said ion radical salt.

8. A solid non-ohmic semiconductor prepared according to the process of claim 1.

9. A solid non-ohmic semiconductor prepared by the process of claim 1, said semiconductor being in contact with electrically conductive means.

10. A solid non-ohmic semiconductor prepared by the process of claim 1, said semiconductor being characterized as having a threshold voltage of 0.2 to 1 volt and a non-ohmic range of from above said threshold voltage to about 10 volts.

References Cited by the Examiner

UNITED STATES PATENTS 2,669,666 2/1954 Mason et al. ---------- 317—262

JOHN W. HUCKERT, *Primary Examiner.*

DAVID J. GALVIN, SAMUEL BERNSTEIN, *Examiners.*

A. S. KATZ, R. F. SANDLER, *Assistant Examiners.*